United States Patent [19]
Williams et al.

[11] Patent Number: 5,815,488
[45] Date of Patent: Sep. 29, 1998

[54] MULTIPLE USER ACCESS METHOD USING OFDM

[75] Inventors: Thomas H. Williams, Longmont; Richard S. Prodan, Boulder, both of Colo.

[73] Assignee: Cable Television Laboratories, Inc., Louisville, Colo.

[21] Appl. No.: 535,593

[22] Filed: Sep. 28, 1995

[51] Int. Cl.$^6$ ..................................................... H04J 11/00
[52] U.S. Cl. ............................................ 370/206; 370/208
[58] Field of Search .................................. 370/20, 21, 22, 370/23, 30, 69.1, 120, 71, 73, 57, 18, 19, 95.1, 205, 206, 208, 209, 210, 314, 320, 321, 324, 335, 336, 337, 344, 343, 342, 347, 441, 442; 380/34; 375/200, 205, 237, 238, 239, 261, 298; 455/38.1

[56] References Cited

U.S. PATENT DOCUMENTS

| | | | |
|---|---|---|---|
| 3,511,936 | 5/1970 | Saltzberg | 370/206 |
| 5,371,548 | 12/1994 | Williams et al. | 348/478 |
| 5,442,662 | 8/1995 | Fukasawa et al. | 370/22 |
| 5,550,809 | 8/1996 | Bottomley et al. | 370/22 |

OTHER PUBLICATIONS

Specs–International, published by Cable Television Laboratories, Jan. 1993, pp. 4–8.

"Using Orthogonal Frequency Division Multiplexing In The Vertical Interval of an NTSC TV Transmission", NAB 1995 Broadcast Engineering Conference Proceedings, pp. 69–78.

N. Himayat, C.A. Eldering, M. Kolber and E.L. Dickinson, "Characteristics of Hybrid Fiber–Coax Return Systems", 1995 Conference On Emerging Technologies, Society of Cable Television Engineers, Jan., 1995, pp. 191, 199 and 200.

T. Funderbunk, C. Eldering, S. Tsao, M. Capuano, S. Loder and R. Segev, "A Hybrid Fiber–Coax System for the Delivery of Telephony and CATV Services", 1995 Conference On Emerging Technologies, Society of Cable Television Engineers, Jan., 1995, pp. 313 and 317.

*Primary Examiner*—Dang Ton
*Attorney, Agent, or Firm*—Meltzer, Lippe, Goldstein, et al.

[57] ABSTRACT

A communication method enables a plurality of remote locations to transmit data to a central location. The remote locations simultaneously share a channel and there is a high degree of immunity to channel impairments. At each remote location, data to be transmitted is coded by translating each group of one or more bits of the data into a transform coefficient associated with a frequency in a particular subset of orthonormal baseband frequencies allocated to each remote location. The particular subset of orthonormal baseband frequencies allocated to each location is chosen from a set of orthonormal baseband frequencies. At each remote location, an electronic processor performs an inverse orthogonal transform (e.g., an inverse Fourier Transform) on the transform coefficients to obtain a block of time domain data. The time domain data is then modulated on a carrier for transmission to the central location. Preferably, the time intervals for data transmission at the different remote locations are aligned with each other. In one embodiment of the invention, all of the baseband frequencies are allocated to a single particular remote location for one time slot. At the remote location, data is received from a plurality of remote locations. The data is demodulated to obtain baseband time domain data. The orthogonal transform is performed on this data to obtain transform coefficients. Each transform coefficient is associated with a baseband frequency. The central location keeps track of which baseband frequencies are allocated to which remote location for subsequent translation of each transform coefficient.

2 Claims, 6 Drawing Sheets

DC

I FILTER
REAL RESPONSE
(IMAGINARY RESPONSE = ALL 0'S)

Q FILTER
IMAGINARY RESPONSE
(REAL RESPONSE = ALL 0'S)

MULTIPLE USER ACCESS METHOD USING OFDM

FIELD OF THE INVENTION

The present invention relates to a communications method which permits multiple users to simultaneously access an RF channel with a high degree of immunity to channel impairments.

BACKGROUND OF THE INVENTION

There are a variety of techniques that allow multiple receivers to use the same bandwidth resource simultaneously. The common techniques are time division multiple access (TDMA), frequency division multiple access (FDMA), and code division multiple access (CDMA). These systems all rely on the orthogonal properties of the transmitted signals. Two functions, such as $f_1(t)$ and $f_2(t)$, are orthogonal over an interval of time, such as from T1 to T2, if the integral of their products over the time interval is zero.

$$\int_{T1}^{T2} f_1(t)f_2(t)dt = 0$$

TDMA works because $f_1(t)$ is zero-valued at the sample time between T1 and T2 when $f_2(t)$ has a non-zero value, and $f_2(t)$ is zero-valued when $f_1(t)$ has a non-zero value. FDMA works because $f_1(t)$ and $f_2(t)$ have different frequency components. Sine functions of different frequencies, such as television channel 2 at 55.25 MHz and channel 3 at 61.25 MHz on a cable system, are orthogonal. CDMA works because the pseudo-noise sequences used by two different codes may be approximately orthogonal over some period of time.

Currently, cable networks have a construction using all coaxial cable or a hybrid construction using some coaxial cable and some fiber optic cable. Conventionally, upstream ("upstream" means going towards the headend) signals use the lower frequencies, such as 540 MHz, although there are some exceptions. Downstream signals going away from the headend use frequencies such as 54–550 MHz. Current proposals for multiple user, multiple access cable upstream transmissions in these networks utilize FDMA, CDMA, and TDMA techniques.

Cellular radio networks typically use frequencies above 800 MHz with a frequency offset between transmit and receive frequencies. Multi-path reflections can create a frequency fade problem for transmissions in these bands. These systems use TDMA, FDMA, and CDMA techniques.

The weakness of FDMA and TDMA data transmission systems for applications, such as upstream cable transmissions, is that the data can be corrupted by various transmission impairments, such as impulse noise, carrier waves (CW), and ghosts or echoes. Random noise, which affects all transmission systems, is typically caused by the receiving amplifier. Impulse noise is typically caused by lightning and man-made devices, such as automobile ignitions or electric motors with brushes, or by arcing on power lines. Carrier wave interference is sometimes caused by ingress of broadcast signals into the cable system, harmonics of other out-of-band transmitters, and leakage from computing equipment.

Echoes or ghosts are a particularly severe problem. Ghosts are caused by multiple signal paths between the transmitter and receiver. In a television receiver, the secondary signal path produces a "ghost" image on the picture tube. In data transmission, the secondary path signal produces an increased data error rate by causing interference between the current data symbol and a data symbol sent at an earlier (or later) time. Typically, the data symbol sent earlier is not correlated with the current data symbol and the current data is made less robust to the other impairments, such as random noise or CW interference. If the level of the ghost is severe enough, or if there are many ghosts, the ghost(s) alone will make the data useless.

CDMA transmissions are rugged to many of the above-mentioned impairments, but suffer from poor spectral efficiency, expressed in bits of data per second, per Hertz of bandwidth.

OFDM (Orthogonal Frequency Division Multiplexing) techniques are being employed to provide high speed baseband data over twisted-pair telephone lines in the ADSL system (asymmetric digital subscriber line). OFDM is also under evaluation for use in Europe for terrestrial broadcast of digital television signals. In this case, the OFDM baseband signal is modulated onto an RF carrier. The OFDM Technique is described in SPECS-INTERNATIONAL published by Cable Television Laboratories in January 1993, and "Using Orthogonal Frequency Division Multiplexing In The Vertical Interval of an NTSC TV Transmission", NAB 1995 Broadcast Engineering Conference Proceedings, pp. 69–78. U.S. Pat. No. 5,371,548 discloses a system which uses a block of OFDM-transformed data in a burst mode inside a horizontal line structure of an NTSC television signal. Compared to TDMA, FDMA, or CDMA systems, OFDM offers transmission advantages. Orthogonal frequency division multiplexing is a technique that was invented by Dr. Burton Saltzberg of Bell Labs, and patented in 1971 (U.S. Pat. No. 3,511,936). In this technique, the high speed data stream, that would conventionally be sent by modulating a single carrier, is broken down into many slower speed data streams and each low speed data stream is used to modulate its own separate frequency component. For maximum bandwidth efficiency, the carriers are orthogonal functions. In the past, this technique was difficult to implement for more than a few carriers because it was difficult to build hardware that maintained orthogonally for many carriers. This technique has become more practical recently because of recent advances in digital signal processing (DSP). In particular, hardware, software, and algorithms have been developed to implement the discrete fast-Fourier-transform. Currently, a 1024 point FFT can be performed in 1–3 ms. by a DSP (digital signal processing) chip, and in about 3 ms. by a high-speed microprocessor. The Fourier transform, and its inverse, are techniques for converting data between the time and frequency domains. The basis of the Fourier transform is sine and cosine functions, which are orthogonal functions.

The discrete Fourier transform, as used by the present invention, is defined by:

$$G(n/NT) = \sum_{k=0}^{N-1} g(kT)\exp(-j2\pi nk/N)$$

$$k = 0,1,2, \ldots ,N - 1$$

where:

$$j = \sqrt{-1}$$

G()=value of sample in frequency domain
g()=value of sample in time domain k=discrete sample number in time domain
N=total number of sample in period
n=discrete sample number in frequency domain
T=time between samples
The inverse discrete Fourier transform is:

$$g(kT) = (1/N) \sum_{n=0}^{N-1} G(n/NT)\exp(j2\pi nk/N)$$

$$n = 0,1,2,\ldots,N-1$$

The Fourier transform and its inverse, operate on complex (real and imaginary) numbers.

OFDM signals have desirable transmission properties. Some ghost immunity comes from the slower data rate of the individual frequency components. If the delay of the ghost is small with respect to the duration of the data interval, the effect of the ghost will be minimal. Additionally, if a "guard interval" is sent, and the guard interval is longer than the delay of any of the ghosts, the effect of the ghosts is reduced even more. A guard interval is a preamble of data, which has been cut from the latter part of the transmission, and placed before the main block of data. The guard interval also allows some timing inaccuracy (offset or jitter), between different users with adjacent data blocks or time slots, without a performance penalty. OFDM is also relatively immune to impulse noise, and it is bandwidth efficient.

Impulse noise immunity comes from the property of the Fourier transform to spread an impulse in the time domain over the frequency domain. Thus, a single noise impulse in the time domain will have its energy spread over many symbols in the frequency domain, causing minimal damage to all symbols in the time interval, but complete destruction to none.

A sufficiently strong CW carrier interfering with an OFDM transmission will cause one symbol to be destroyed in each transform period, but if error correcting codes are used, the lost information can be recovered.

It is an object of the present invention to use an OFDM type method to enable multiple remote locations to share a transmission channel to a central location (e.g., a headend in a cable system) in a way such that channel impairments are alleviated.

SUMMARY OF THE INVENTION

An inventive communication method enables a plurality of remote locations to transmit data to a central location. The remote locations simultaneously share a channel and there is a high degree of immunity to channel impairments.

At each remote location, data to be transmitted is coded as follows. A particular subset of orthonormal baseband frequencies is allocated to each remote location. The particular subset of orthonormal baseband frequencies allocated to each location is chosen from a set of orthonormal baseband frequencies. At each remote location, each group of one or more data bits to be transmitted is translated into a transform coefficient associated with one of the frequencies allocated to the remote location. At each remote location, an electronic processor performs an inverse orthogonal transform (e.g., an inverse Fourier Transform) on the transform coefficients to obtain a block of time domain data. The time domain data is then modulated on a carrier for transmission to the central location. Preferably, the time intervals for data transmission at the different remote locations are aligned with each other.

In some embodiments of the invention, all of the baseband frequencies are allocated to a different particular remote location in each different time slot.

At the central location, data is received from a plurality of remote locations. The data is demodulated to obtain baseband time domain data. The orthogonal transform is performed on this data to obtain transform coefficients. Each transform coefficient is associated with a baseband frequency. The central location keeps track of which baseband frequencies are allocated to which remote locations. This enables the transform coefficients of each remote location to be translated back into the data stream of that remote location.

DETAILED DESCRIPTION OF THE INVENTION

Figure 1:
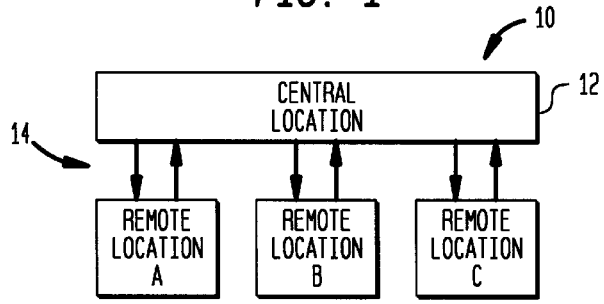
FIG. 1 schematically illustrates a network in which a plurality of remote locations share a communication channel for transmissions to a central location according to the present invention.

FIG. 1 schematically illustrates a network in which the present invention may be utilized. The network 10 of FIG. 1 comprises a central location 12 and a plurality of remote locations A, B, C. Illustratively, the network 10 is a cable network, the central location is a headend and the remote locations are subscriber locations. The channel 14 between the headend and the remote locations may be implemented using coaxial cable, optical fiber, wireless or some combination of the above. In general, as indicated above, the channel may be divided into a downstream band (e.g. 54–550 MHz) and an upstream band (e.g. 5–40 MHz.) The downstream band is used by the headend to transmit data such as broadcast TV programs to the remote locations. The upstream band is used to transmit data (e.g., for interactive TV, voice, data, etc.) from the remote locations to the headend.

The present invention permits a plurality of remote locations (e.g., A, B, C) to simultaneously share the upstream band for transmission to the headend with a high degree of immunity to channel impairments.

Figure 2:
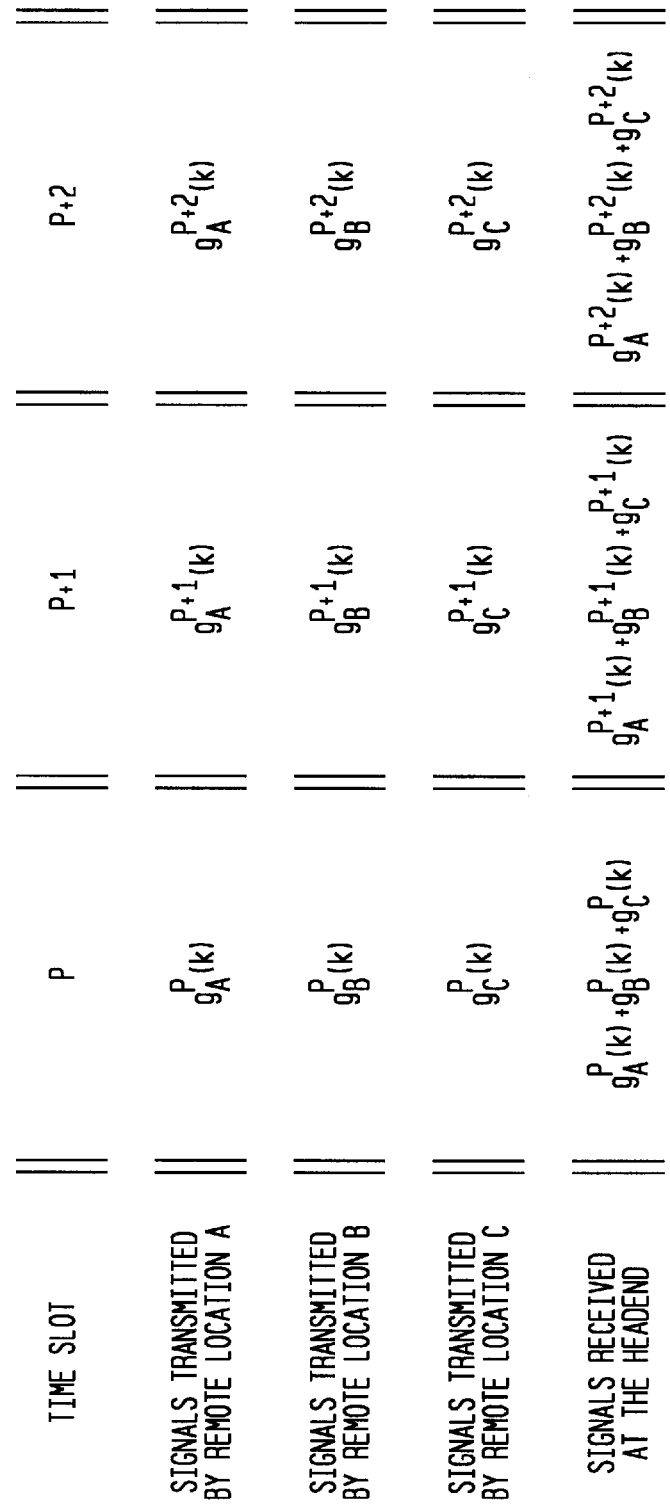
FIG. 2 illustrates the time domain baseband signals transmitted by the remote locations to the central location according to the invention.

FIG. 2 shows how the plurality of remote locations transmit simultaneously to the headend or central location. Consider a plurality of successive time slots labeled P, P+1, P+2, P+3, etc. Each time slot is, for example, 128 μsec long. Successive time slots are separated by a guard interval of 5.33 μsec. The purpose of the guard interval is discussed below.

In the time slot P, the remote location A transmits to the headend the time domain baseband signal $g_A^P(k)$, where k is a discrete time variable, the subscript A indicates the remote location and the superscript P indicates the time slot. The remote location B transmits the time domain baseband signal $g_B^P(k)$ to the headend, and the remote location C transmits the time domain baseband signal $g_C^P(k)$ to the headend. In the time slot P+1, the remote location A transmits the time domain baseband signal $g_{AP+1}(k)$ to the headend, the remote location B transmits the time domain baseband signal $g_B^{P+1}(k)$ to the headend, and the remote location C transmits the time domain baseband signal $g_C^{P+1}(k)$ to the headend. As is explained below, it is desirable for all the time domain baseband signals in a time slot (e.g., $g_A^P(k)$, $g_B^P(k)$, $g_C^P(k)$ in the time slot P) to be modulated onto the same carrier frequency for transmission from the remote locations to the headend. In addition, it is desirable for the time slots used by the individual remote locations for the transmission of their time domain baseband signals to be time aligned with each other. Such alignment is shown in FIG. 2.

As shown in FIG. 2, the time domain baseband signal received by the headend in the time slot P is $g_T^P(k) = g_A^P(k) + g_B^P(k) + g_C^P(k)$ (i.e., a superposition of the three remote location time domain baseband signals). Similarly, the time domain baseband signal received by the headend in the time slot P+1 is $g_T^{P+1}(k) = g_A^{P+1}(k) + g_B^{P+1}(k) + g_C^{P+1}(k)$.

Figure 3:
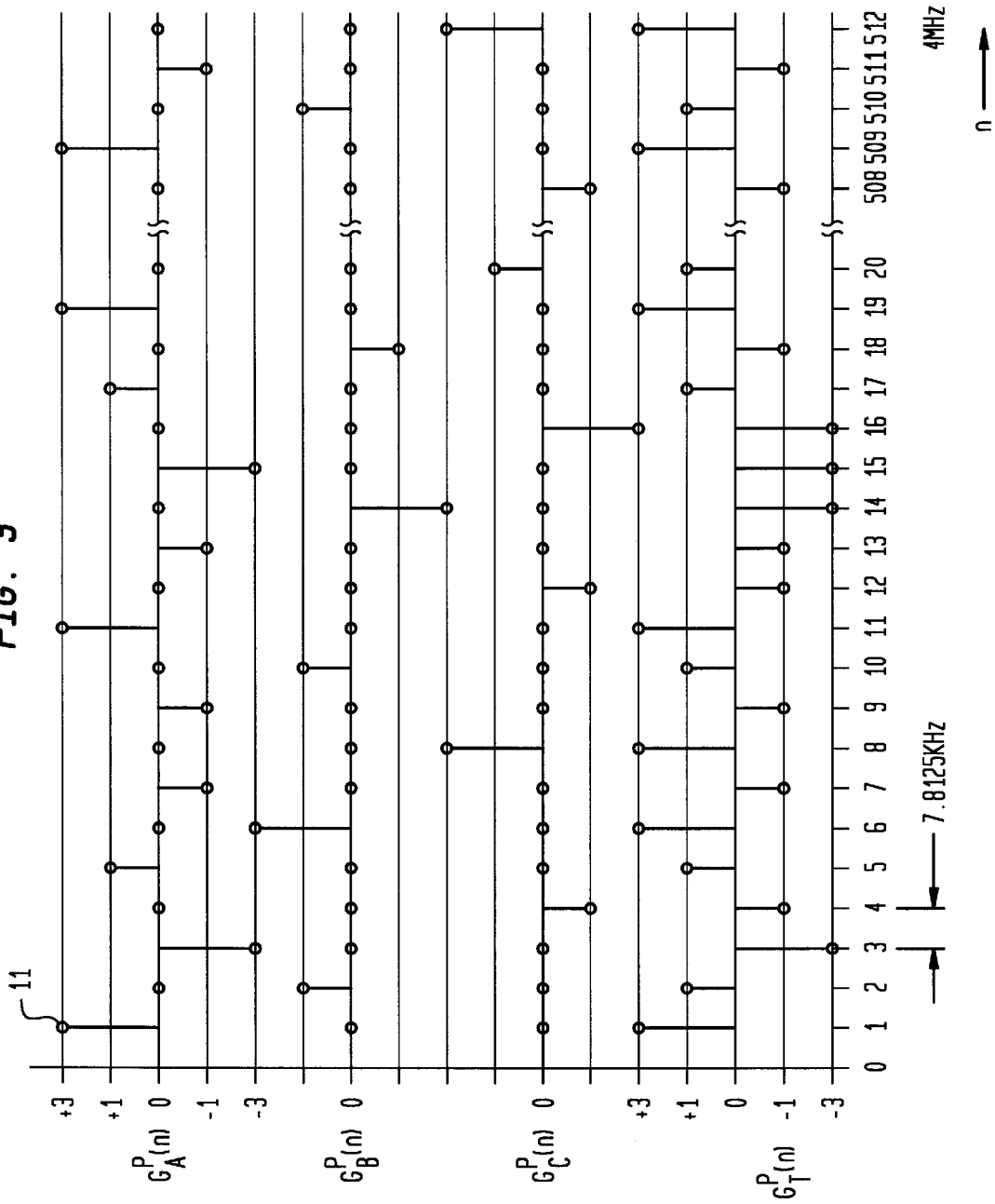
FIG. 3 illustrates the functions of FIG. 2 in the frequency domain.

It is now explained how the individual remote locations generate the time domain baseband signals that are transmitted to the headend. FIG. 3 shows a frequency space representation of the signals $g_A^P(k)$, $g_B^P(k)$ and $g_C^P(k)$. These frequency space representations are designated $G_A^P(n)$, $G_B^P(n)$, $G_C^P(n)$. FIG. 3 also shows the superposition of $G_A^P(n) + G_B^P(n) + G_C^P(n) = G_T^P(n)$ which is the frequency space representation of $G_T^P(k)$.

Illustratively, the frequency space variable n can take on N discrete values, labeled 0,1,2, . . . ,N. Illustratively, N is 512. Discrete frequencies corresponding to adjacent values of n are separated by 7.8125 kHz, for example, so that the total bandwidth of the N=512 frequency components is 4 MHz. The frequency space variable n is plotted along the horizontal axis in FIG. 3.

A subset of the N frequency space values is allocated to each of the remote locations. For example, the values n=1, 3, 5 . . . N−1 are allocated to the remote location A. The values n=2, 6, 10, . . . are allocated to the remote location B. The values n=4, 8, 12, . . . are allocated to the remote location C.

Several features about the allocation of frequency space values n to remote locations should be noted. First, the allocation of n values is mutually exclusive. No value of n can be allocated to more than one remote location in a particular time slot. The number of n values allocated to a remote location depends on how much data the remote location has to transmit to the headend. For example, the remote location A is allocated twice as many n values as the remote locations B and C and can transmit data at twice the rate of the remote locations B and C. The number of n values allocated to each remote location can vary from one time slot to another, as the amount of data a remote location has to transmit to the headend can vary over time. Moreover, to provide even greater immunity to channel impairments, the particular n values allocated to a particular remote location may change from one time slot to the next even if the number of n values allocated to the remote location remains the same. For example, in time slot P, the remote location A may be allocated n=0, 2, 4 . . . and in time slot P+1 the remote location A may be allocated n =1, 3, 5, . . .

In some embodiments of the invention, all of the n values may be allocated to a different remote location in each different time slot. For example, in time slot P all of the n values are allocated to remote location A, in time slot P+1 all of the n values are allocated to remote location B, in time slot P+1 all of the n values are allocated to remote location A, in time slot P+2 all of the n values are allocated to the remote location C. This latter embodiment really amounts to a TDMA scheme of transformed data wherein only one remote location can transmit to the headend in a time slot.

In other embodiments of the invention, several carriers or frequency components are assigned to transmit a single symbol. At the receive site, the received signal is averaged to reduce the effects of channel impairments and give more noise immunity. This is used in hostile environment at the price of spectral efficiency. This approach is functionally similar to, but better than CDMA, where CDMA suffers from obtaining good orthogonality between codes.

In any event, in each time slot P, P+1, etc., each remote location generates the transform coefficients G(n) for the values of n assigned to it. Zero stuffing is used at each remote location to fill in the G(n) at values of n not assigned to the particular remote location.

The values of G(n) are determined at each remote location as follows:

Each transform coefficient G(n) may be chosen from a set of values such as {−3, −1, 3, 1}. Bits to be encoded are mapped into the coefficient values. For example, when there are four coefficient values, the mapping may be as follows:

0, 0=+3
0, 1=+1
1, 0=−1
1, 1=−3

In hostile environment, fewer symbol levels can be used to produce more rugged data. For example, instead of transmitting four voltage levels, +3,+1,−1, and −3 volts, only +3 and −3 volts are used. Thus, data capacity is traded off against noise immunity.

Consider the string of data 00, 11, 01, 10, 10, 00, 10, . . . to be transmitted in the time slot P by the remote location A. This is mapped into the symbol sequence +3, −3,+1,−1, −1, +3, −1, . . . As location A is allocated the n values n=1, 3, 5, 7, . . . , the transform coefficients $G_A^P(n)$ are as follows:

| | | |
|---|---|---|
| $G_A^P(n = 1)$ | = | +3 |
| $G_A^P(n = 3)$ | = | −3 |
| $G_A^P(n = 5)$ | = | +1 |
| $G_A^P(n = 7)$ | = | −1 |
| $G_A^P(n = 9)$ | = | −1 |
| $G_A^P(n = 11)$ | = | +3 |
| $G_A^P(n = 13)$ | = | −1 |

The values $G_A^P(n)$, for n=2, 4, 6, 8, . . . are set to 0 by the remote location A.

The discrete frequency domain function $G_A^P(n)$ for the remote location A for the time slot P is plotted in FIG. 3. The discrete frequency domain functions $G_B^P(n)$ and $G_C^P(n)$ for the remote locations B and C for the time slot P are also plotted in FIG. 3.

To obtain the time domain baseband signals $g_A^P(k)$, $g_B^P(k)$, $g_C^P(k)$ to be transmitted in a time slot P, an inverse orthogonal transform (e.g., an inverse discrete Fourier transform) is applied to the frequency domain functions $G_A^P(n)$, $G_B^P(n)$, $G_C^P(n)$ by the remote locations A, B, and C.

Figure 4:
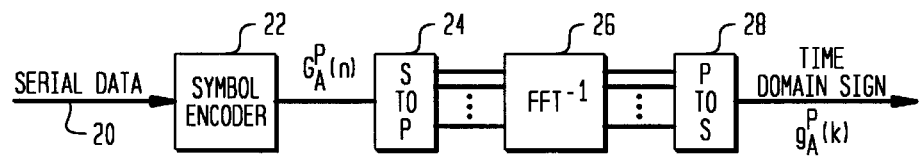
FIG. 4 illustrates a circuit for coding data at a remote location for transmission to the central location, according to the invention.

A circuit which may be utilized at a remote location to obtain the baseband time domain signal $g_A^P(k)$, $g_B^P(k)$, or $g_C^P(k)$ is shown in FIG. 4. For example, at the remote location A, serial data 20 enters a symbol encoder 22 which serially generates the discrete values $G_A^P(n)$. The values $G_A^P(n)$ are converted from serial to parallel form by the serial-to-parallel converter 24. The signal $G_A^P(n)$ is now processed by the $FFT^{-1}$ circuit 26. The $FFT^{-1}$ circuit 26 may be implemented as a dedicated $FFT^{-1}$ circuit, by a DSP circuit, or by a general purpose microprocessor. The time domain samples outputted by the $FFT^{-1}$ circuit 26 are converted to serial form by the parallel-to-serial converter 28 to obtain the time domain signal $g_A^P(k)$.

In each time slot (e.g., P), the time domain basebands signals (e.g., $g_A^P(k)$, $g_B^P(k)$, $g_C^P(k)$) are modulated onto a carrier frequency at the respective remote locations and transmitted to the headend. At the headend the received signals are demodulated down to baseband. The demodulated time domain baseband signal at the headend is $g_T^P(k)$ =$g_A^P(k)$ +$g_B^P(k)$+$g_C^P(k)$. The orthogonal transform (e.g., FFT) is applied to $g_T^P(k)$ to obtain a discrete frequency domain baseband signal $G_T^P(n)$ which is the superposition of $G_A^P(n)+G_B^P(n)+G_C^P(n)$. The signal $G_T^P(n)$ is plotted in FIG. 3. From the signal $G_T(n)$, it is possible to decode the data transmitted from each remote location A, B. C in each time slot. This is because the decoder at the headend keeps track of which values of n are allocated to which remote location. This tracking can be done in several ways. The allocation of n values to remote locations may be fixed or may vary according to a predetermined pattern known to both the headend and the remote location.

Alternatively, a system controller can dynamically allocate n values to the remote locations and keep the headend and remote locations informed of the allocation used in successive time slots.

Figure 5:
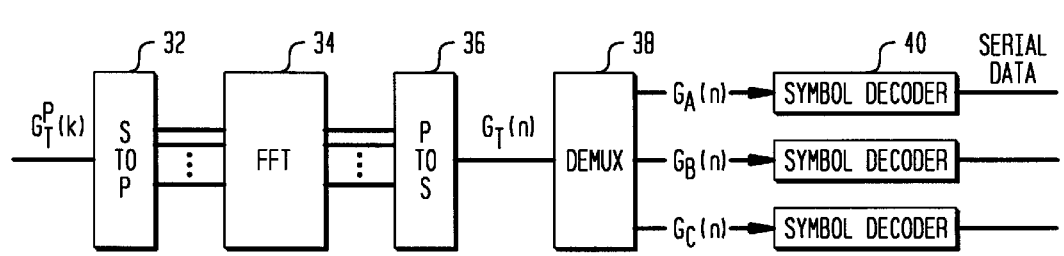
FIG. 5. illustrates a circuit for decoding data at the central location, according to the invention.

FIG. 5 shows a circuit 30 which may be used at the headend to reconstruct the serial data transmitted from each remote location. The demodulated baseband data $G_T^P(n)$ is converted to parallel form by the serial-to-parallel converter 32. Then, the orthogonal transform (e.g., an FFT) is applied using circuit 34. The circuit 34 may be a dedicated hardware circuit, a DSP circuit, or a general purpose microprocessor. The output of the FFT circuit 34 is converted to serial form by the parallel-to-serial converter 36. The output is $G_T(n)$. The discrete frequency domain function $G_T^P(n)$ is plotted in FIG. 3.

The demultiplexer 38, which keeps track of which n values (which discrete frequency components) are allocated to each remote location, separates $G_T^P(n)$ into $G_A^P(n)$, $G_B^P(n)$, $G_C^P(n)$. Each of $G_A^P(n)$, $G_B^P(n)$, $G_C^P(n)$ is processed by a symbol decoder 40 which regenerates the corresponding serial data streams.

In the case where the TDMA implementation is used, in each time slot the headend would receive data from only one remote location so that no demultiplexing is necessary.

Using the foregoing technique, the total data capacity for a given remote location u is given by C(u)=S * Q(n) * BF * BS, where C(u) is the data rate for user u in bits per second.

S is the number of symbols in a transform block (e.g., 512)

Q(n) is the fraction of the total number of discrete baseband frequencies allocated to the user u (e.g., 0.5 for remote location A)

BF is the transform block transmission rate (e.g. 7500 Hz)

BS is the number of bits per symbol (e.g. 2)

Figure 6:
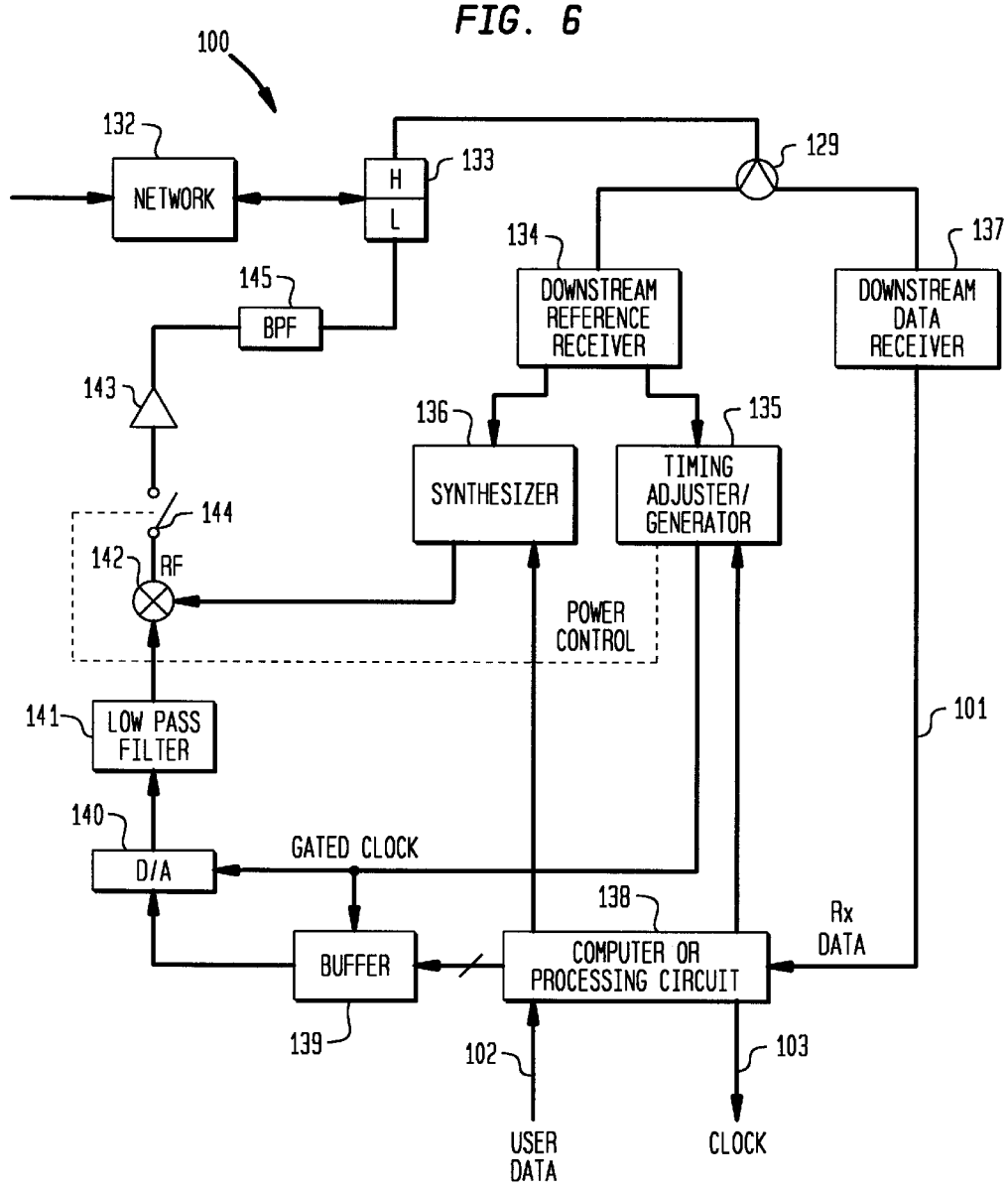
FIG. 6 illustrates a reception/transmission system for use at a remote location according to the invention.

FIG. 6 is a block diagram of a data transmission/reception system 100 at a remote user location in a cable network which can be used to carry out the present invention.

The data transmission/reception system 100 of FIG. 6 receives downstream signals from the headend and transmits upstream signals to the headend via the network 132. Upstream and downstream signals are separated by the diplex filter 133.

It is desirable for all remote locations which transmit data to the headend to use the same carrier frequency. Accordingly, the downstream signal received from the headend includes reference frequency information. Another desirable feature is to have time synchronization among multiple locations transmitting simultaneously to the headend. This means that the time slots of the various remote locations should not be out of synchronization by more than the guard interval. This can be accomplished by transmitting timing pulses from the headend to the remote locations to define the time slots. From the splitter 129, the downstream reference receiver 134 receives the downstream reference signals from the headend and supplies timing pulses to the timing adjuster generator 135 and the reference frequency information to the carrier frequency synthesizer 136. The carrier frequency synthesizer 136 then generates the carrier frequency. The splitter 129 also sends to the downstream data receiver 137 addressed commands for the transmission/reception system 100. The addressed commands include commands for adjusting the timing adjuster generator 134 and commands for adjusting the power level of the frequency synthesizer. The data receiver 137 may also receive information indicating which discrete frequencies (i.e., which n-values) are allocated to the remote location in particular time slots. The downstream data receiver 137 transmits the addressed commands and frequency allocation information to the computer or processing circuit 138 via path 101. The processing circuit 138 also receives user data to be transmitted to the headend via input 102 and outputs a clock signal at output 103.

The processing circuit 138 includes coding circuitry (such as that shown in FIG. 4) for generating time domain baseband signals to be transmitted to the headend.

The processing circuit 138 also includes control circuitry for sending control signals to the frequency synthesizer 136 and timing adjuster generator 135 in response to the addressed commands. The process of adjusting timing so that transmissions arrive in their correct time slots is referred to as "ranging".

In a preferred embodiment of the invention the processing circuit 138 includes a microprocessor. This microprocessor performs the $FFT^{-1}$ operation to generate a time domain baseband signal and also generates the control signals for the frequency synthesizer 136 and timing adjuster generator 138.

The time domain baseband signal to be transmitted to the headend is stored by the processing circuit 138 in the buffer 139. At the correct time for the start of transmission, the timing adjuster generator 135 provides a clock to move the encoded user data out of the buffer 139 into the digital-to-analog converter 140. The data, now in analog form, is processed by the low pass filter 141 to remove aliasing. The time domain baseband data in analog form is then modulated onto a carrier by the modulator 142. The modulator 142 may be a double-balanced mixer. The carrier frequency is supplied by the synthesizer 136 in response to information received from the headend.

The RF output signal of the modulator 142 is amplified by amplifier 143. The gate 144, which is controlled by the timing adjuster generator 135, serves to limit the transmission of undesired energy in the upstream band and supplies anti-babble protection. The bandpass filter 145 removes out of the band energy and spurious frequencies from the RF signal to be transmitted. This modulation system produces a double-sideband AM signal.

The modulated signal is coupled into the network 132 via the diplex filter 133 and transmitted to a headend.

Figure 7A:
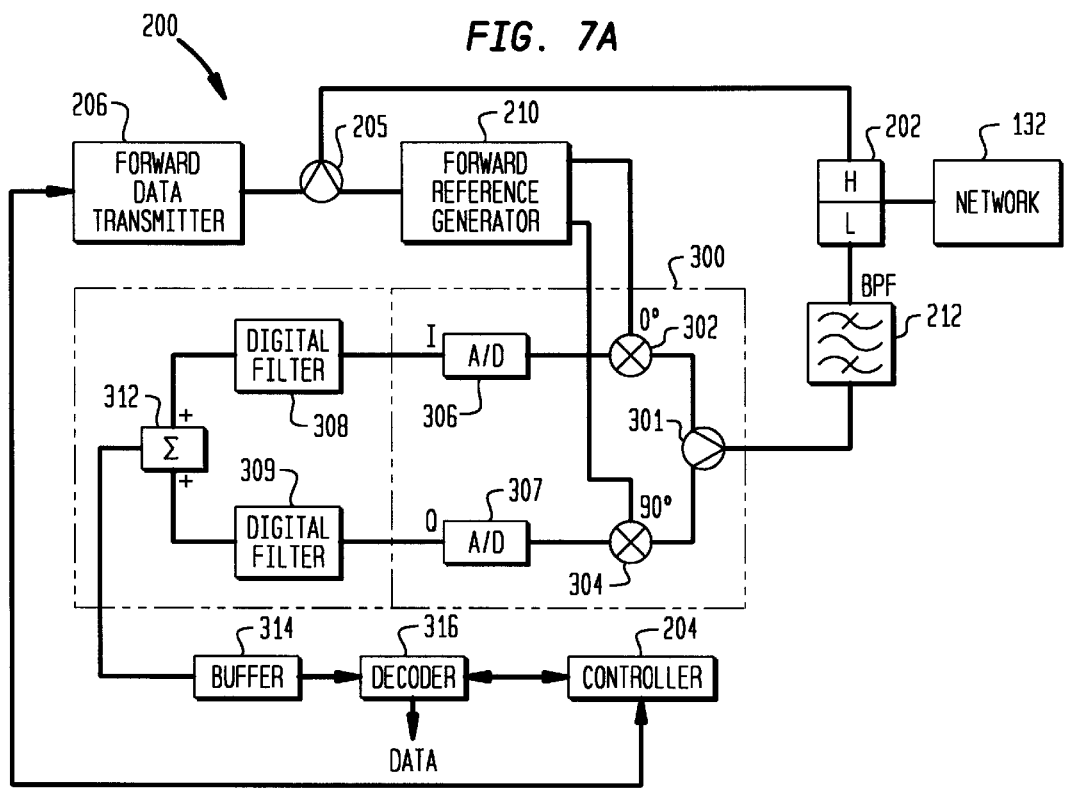
FIG. 7A illustrates a reception/transmission system for use at a central location according to the invention.
Figure 7B:
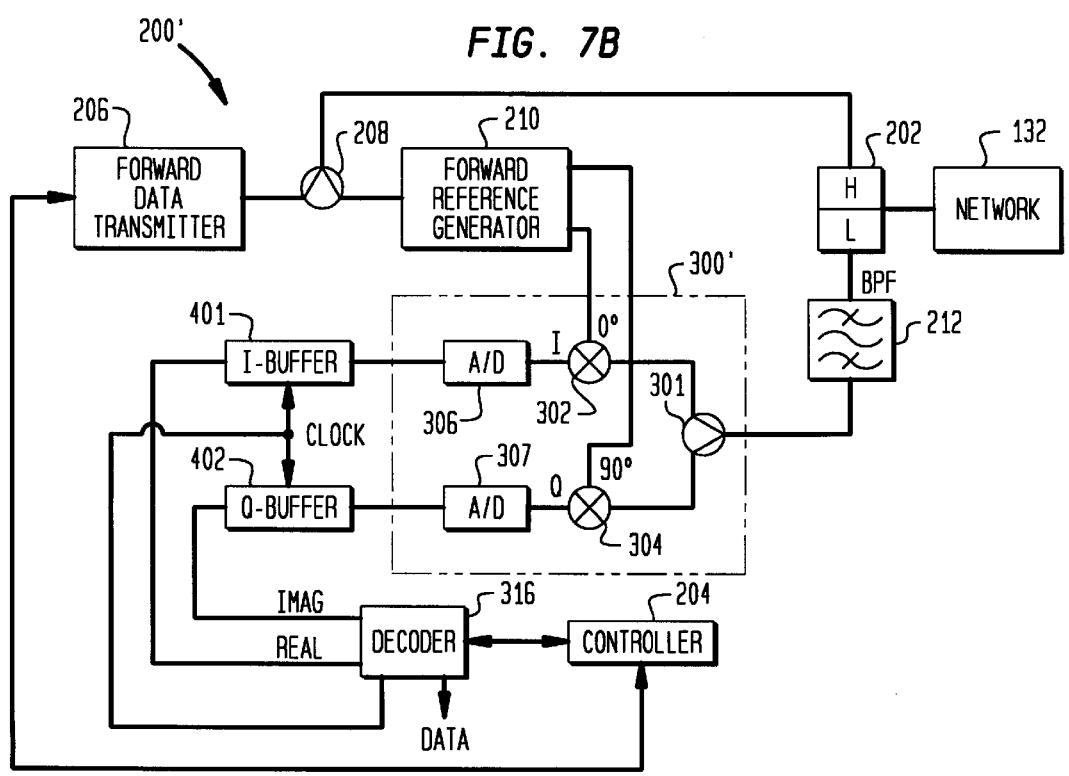
FIG. 7B illustrates an alternative reception/transmission system for use at a central location according to the invention.

A headend data reception system 200 at a headend is shown in FIG. 7A. An alternate data reception system 200' is shown in FIG. 7B.

The reception system 200 includes a diplex filter 202 for separating downstream signals to be transmitted to user stations from upstream signals transmitted from user stations. A forward data transmitter 206 controlled by a controller 204 generates addressed commands (e.g. commands for adjusting the timing adjuster generator at a particular remote location, or commands for ranging) and discrete frequency allocation information (e.g., which discrete frequencies are allocated to which remote locations in particular time slots.) The controller 204 transmits this information to the forward data transmitter 206.

The forward data transmitter 206 modulates this information onto an RF carrier which is sent via the combiner 208 and diplex filter 202 to the network 132 for transmission to the remote locations. The reference carrier information and timing pulses used by the remote locations are generated by the forward reference generator 210. This information is transmitted remotely via the combiner 208, diplex filter 202, and network 132 to the remote locations. The reference carrier information and timing pulses generated by the forward reference generator 210 are also used to control the demodulator 300.

The upstream signal is received from the network 132 and transmitted via the diplex filter 202 and bandpass filter 212 to the demodulator 300. The modulator 300 receives modulated carrier signals from the forward reference generator 210. The splitter 301 delivers the received modulated signal to the multipliers 302 and 304. The multiplier 302 multiplies the received signal with an in-phase carrier. The resulting signal is then low pass filtered (using a low pass filter not shown) to generate an in-phase baseband signal. The multiplier 304 multiplies the received signal with a quadrature carrier. The quadrature carrier is shifted 90° with respect to the in-phase carrier. The resulting signal is then low pass filtered (using a low pass filter not shown) to generate a quadrature baseband signal. The in-phase baseband signal is then converted to digital form using analog-to digital converter 306. The digital in-phase baseband signal is then filtered by the in-phase digital filter 308. The quadrature baseband signal is converted to digital form by the analog-to-digital converter 307 and then filtered by the quadrature digital filter 309.

Figure 8A:
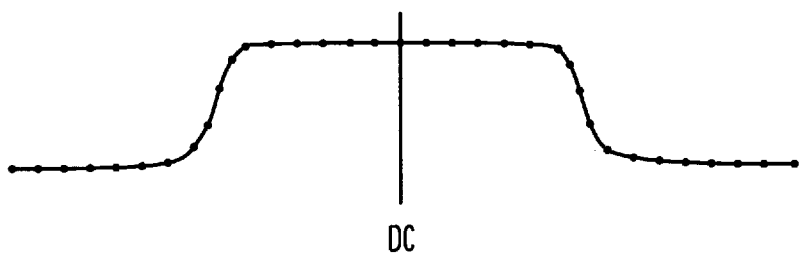
FIGS. 8A and 8B illustrate the transfer characteristics of in-phase and quadrature baseband filters of the system of FIG. 7B.
Figure 8B:
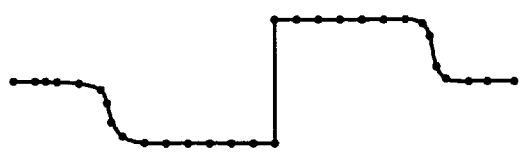

FIG. 8A shows the frequency response of the in-phase digital filter 308. FIG. 8B shows the frequency response of the quadrature digital filter 309. The in-phase filter 308 has a purely real symmetric response. The quadrature filter 309 has a purely imaginary antisymmetric response. This demodulator desirably utilizes a coherent carrier but does not require the carrier to have any particular phase. The length of the filters (number of taps) determines the lowest baseband frequency component which can be properly filtered. If only short filters (small number of taps) are utilized, it may be necessary to abandon use of the lower baseband frequency components. The filters function to reject one sideband while passing the other desired sideband. Thus an RF-VSB filter may be used to conserve bandwidth.

The outputs of the digital filters 308, 309 are summed by the summer 312. The resulting real signal is stored in the buffer 314 and decoded using a decoding circuit 316.

The operation and structure of the decoding circuit 316 has been described above in connection with FIG. 5. The reconstructed data output by the decoder 316 is transmitted to the controller 204.

An alternative headend data reception system is shown in FIG. 7B. The reception system 200' differs from the reception system 200 of FIG. 2A in that the modulator 300' differs from the modulator 300. Specifically, the in-phase and baseband filters 308, 309 are omitted. Instead, the digital in-phase and quadrature signals are stored in the in-phase and quadrature buffers 401, 402. In this case, the decoding circuit 316 uses the in-phase values as real values and the quadrature values as imaginary values to perform the FFT. When the transform is done, the upper sidebands (frequency components) appear in the output of one half of the transform and the lower sidebands (frequency components) appear in the other half of the sidebands. Thus, this method works with VSB also.

With this method, the amplitude of the carrier may be found by taking the square root of the sum of the squares of the real and imaginary components. The phase of the carrier may be found by taking the arctangent of the ratio of the imaginary and real components.

This demodulation technique also provides the relative phases of the different baseband frequency components. The relative phase among frequency components of the same remote location is expected to be about zero. It is expected that the phase between different remote locations will be different as a result of different delays associated with different signal paths.

In short, there is disclosed a method using OFDM which permits multiple remote users to share a channel to transmit data to a central location. The inventive method provides a high degree of immunity to channel impairment.

While the invention has been described in connection with FFTs (Fast Fourier Transforms) other transforms such as the discrete sine transform, the discrete cosine transform, and the Walsh Transform, may be used.

Finally, the above described embodiments of the invention are intended to be illustrative only. Numerous alternative embodiments may be devised by those skilled in the art without departing from the spirit and scope of the following claims.

We claim:

1. A method for enabling a plurality of remote locations to transmit data to a central location comprising the steps of:

at each remote location, coding data to be transmitted by translating each group of one or more bits of said data into a transform coefficient associated with a particular baseband frequency in a particular subset of orthogonal baseband frequencies allocated to the remote location, the particular subset of orthogonal baseband frequencies allocated to each remote location being chosen from a set of orthogonal baseband frequencies, the subsets of baseband frequencies allocated to each remote location being mutually exclusive.

at each remote location, using an electronic processor, performing an inverse orthogonal transformation on said transform coefficients to obtain a block of time domain data;

at each remote location, utilizing a modulator to modulate said block of time domain data onto a carrier signal for transmission to said central location, said carrier signal having the same carrier frequency for each remote location;

receiving at said central location from one or more of said remote locations, one or more blocks of time domain data modulated on one or more of said carrier signals;

using a demodulator, demodulating said one or more blocks of time domain data from the carrier frequency signal.

performing said orthogonal transformation on said demodulated time domain data to reconstruct said transform coefficients, and translating said transform coefficients into said data to be translated from each remote location.

2. A method for enabling a plurality of remote locations to transmit data to a central location comprising the steps of:

at each remote location, coding data to be transmitted by translating each group of one or more bits of said data into a transform coefficient associated with a particular baseband frequency in a particular subset of orthogonal baseband frequencies allocated to the remote location, the particular subset of orthogonal baseband frequencies allocated to each remote location being chosen from a set of orthogonal baseband frequencies, the subsets of baseband frequencies allocated to each remote location being mutually exclusive;

at each remote location, using an electronic processor, performing an inverse orthogonal transformation on said transform coefficients to obtain a block of time domain data;

at each remote location, utilizing a modulator to modulate said block of time domain data onto a carrier signal for transmission to said central location, said carrier signal having the same carrier frequency for each remote location.

receiving at said central location from one or more of said remote locations, one or more blocks of time domain data modulated on one or more of said carrier signals;

using a demodulator, multiplying said received one or more blocks of time domain data with in-phase and quadrature carrier signals to obtain in-phase and quadrature baseband signals, converting said in-phase and quadrature baseband signals to digital form, and using an electronic processor, performing said orthogonal transform using said in-phase and quadrature baseband signals as real and imaginary values, respectively, to demodulate said one or more blocks of time domain data from the carrier frequency signal, and performing said orthogonal transformation on the demodulated time domain data to reconstruct said transform coefficients.

* * * * *